United States Patent
Figiel et al.

(10) Patent No.: US 9,630,265 B2
(45) Date of Patent: Apr. 25, 2017

(54) POWERED TWO-STAGE STRAP CUTTER

(71) Applicant: Premark Packaging LLC, Glenview, IL (US)

(72) Inventors: Janusz Figiel, Mundelein, IL (US); Jason R. Nasiatka, Northbrook, IL (US)

(73) Assignee: Signode Industrial Group LLC, Glenview, IL (US)

(*) Notice: Subject to any disclaimer, the term of this patent is extended or adjusted under 35 U.S.C. 154(b) by 0 days.

(21) Appl. No.: 14/263,435

(22) Filed: Apr. 28, 2014

(65) Prior Publication Data

US 2015/0000491 A1 Jan. 1, 2015

Related U.S. Application Data

(60) Provisional application No. 61/840,656, filed on Jun. 28, 2013.

(51) Int. Cl.
*B26D 5/42* (2006.01)
*B23D 29/00* (2006.01)
(Continued)

(52) U.S. Cl.
CPC .......... *B23D 29/00* (2013.01); *B23D 29/002* (2013.01); *B26D 1/085* (2013.01); *B26D 5/086* (2013.01);
(Continued)

(58) Field of Classification Search
CPC ...... B23D 33/08; B23D 29/00; B23D 29/002; B26D 1/085; B26D 5/086; B26D 5/18;
(Continued)

(56) References Cited

U.S. PATENT DOCUMENTS 2,052,630 A 9/1936 Hoskwith
2,065,630 A * 12/1936 Jacoby ............. F02M 35/10124
123/184.41
(Continued)

FOREIGN PATENT DOCUMENTS

CN 1388040 A 1/2003
CN 200942881 Y 9/2007
(Continued)

OTHER PUBLICATIONS

International Preliminary Report on Patentability (Ch. 1 of PCT) and Written Opinion of the International Search Authority dated Dec. 29, 2015, in PCT/US2014/035882.
(Continued)

*Primary Examiner* — Omar Flores Sanchez
(74) *Attorney, Agent, or Firm* — Levenfeld Pearlstein, LLC

(57) ABSTRACT

A powered cutter for strap includes a housing, a power supply mounted to the housing, a motor positioned at least in part in the housing and a drive train operably connected to the motor. A cutting head includes a plunger, a cutting blade operably mounted to the plunger, a hold-down biasedly mounted to the plunger, a foot and a shear edge. The drive train is operably connected to the plunger. The plunger moves toward the foot to move the hold-down into contact with the strap, securing the strap against the foot, and as the hold-down secures the strap, the cutting blade contacts and cuts the strap at the shear edge.

9 Claims, 9 Drawing Sheets

(51) Int. Cl.
*B26D 1/08* (2006.01)
*B26D 5/08* (2006.01)
*B26D 5/18* (2006.01)
*B26D 7/01* (2006.01)
*B65B 69/00* (2006.01)
*B26D 1/00* (2006.01)

(52) U.S. Cl.
CPC .............. *B26D 5/18* (2013.01); *B26D 7/01* (2013.01); *B65B 69/0025* (2013.01); *B26D 2001/0066* (2013.01); *Y10T 83/576* (2015.04)

(58) Field of Classification Search
CPC .............. B26D 5/01; B26D 2001/0066; B65B 69/0025; Y10T 83/576
USPC ............. 83/385, 386; 30/115, 228, 210, 180
See application file for complete search history.

(56) References Cited

U.S. PATENT DOCUMENTS

| | | | | |
|---|---|---|---|---|
| 3,599,328 A | | 8/1971 | Ursetta | |
| 3,710,445 A | * | 1/1973 | Roth | 30/241 |
| 4,069,583 A | * | 1/1978 | Stubbings | 30/228 |
| 4,250,784 A | * | 2/1981 | Bredow | 83/518 |
| 4,742,742 A | * | 5/1988 | Yokoe | 83/101 |
| 4,756,085 A | | 7/1988 | Lebessis | |
| 5,195,413 A | * | 3/1993 | Johnson | 83/132 |
| 5,235,750 A | * | 8/1993 | Brown | 30/135 |
| 2005/0115081 A1 | * | 6/2005 | Tu | 30/228 |
| 2011/0214292 A1 | * | 9/2011 | Heh | 30/228 |
| 2011/0314680 A1 | * | 12/2011 | Zhang et al. | 30/228 |
| 2013/0085053 A1 | * | 4/2013 | Figiel et al. | 493/84 |
| 2014/0165410 A1 | * | 6/2014 | Johnson et al. | 30/228 |

FOREIGN PATENT DOCUMENTS

| | | |
|---|---|---|
| CN | 200951836 Y | 9/2007 |
| CN | 102514025 A | 6/2012 |
| CN | 102773871 A | 11/2012 |
| DE | 1922327 U | 6/1965 |
| EP | 1525958 A1 | 4/2005 |
| FR | 2659622 A1 | 9/1991 |

OTHER PUBLICATIONS

International Search Report for PCT/US2014/035882 dated Sep. 12, 2014.

* cited by examiner

POWERED TWO-STAGE STRAP CUTTER

CROSS-REFERENCE TO RELATED APPLICATION DATA

This application claims the benefit of and priority to U.S. Provisional Patent application Ser. No. 61/840,656, filed Jun. 28, 2013, the disclosure of which is incorporated herein in its entirety.

BACKGROUND

Strap material is often used to secure loads. For example, in the packaging and shipping of loads of lumber, bricks and the like, steel strap material is used to contain the load in a bundle so that the load can be handled, moved or stored in quantity as a single unit. When a load needs to be broken down into individual units, the strap must be cut or severed to provide access to individual items in the load.

Strap material can, of course, be cut with a conventional manual shear. However, repeated use, especially when the orientation of the load or strap is awkward, can be time consuming and fatiguing. Nevertheless, manual shears are the accepted norm for strap cutting.

Moreover, known shears include only a blade to cut the strap. There are no known shears that contain one or both of the ends of the strap after the cut has been made.

Accordingly, there is a need for a powered strap cutter. Desirably, such a cutter is locally powered. More desirably, such a cutter is configured to hold down one or both of the strap ends as the strap is being cut.

SUMMARY

Various embodiments of the present disclosure provide a powered cutting tool or cutter for strap. In an aspect, the cutter can hold down one or both of the strap ends following cutting. In an embodiment, the cutter can include a housing, a power supply, such as a battery, mounted to the housing, a motor positioned at least in part in the housing and a drive train operably connected to the motor.

The cutter includes a cutting head having a plunger, a cutting blade operably mounted to the plunger, a hold-down biasedly mounted to the plunger, a foot and a shear edge. The drive train is operably connected to the plunger.

The plunger moves toward the foot to move the hold-down into contact with a strap securing the strap against the foot. The hold-down secures the strap against the foot and the cutting blade contacts and cuts the strap at the shear edge.

In an embodiment, the hold-down is biasedly mounted to the plunger by one or more springs. As the plunger moves toward the foot and the hold-down contacts the strap, the springs compress to permit the cutting blade to contact and cut the strap against the shear edge. In an embodiment, guide elements can be used to mount the hold-down to the plunger and springs can be positioned on the guide elements, between the hold-down and the plunger.

The drive train can include a gear coupled to the motor to drive the plunger and a link extending from the gear to the plunger. In an embodiment, the gear is a drive gear and the link is coupled to the drive gear to move the plunger. The link is eccentrically coupled to the plunger to move the plunger in a reciprocating manner.

An embodiment of the cutter includes a toe guard extending from the cutting head toward the foot, in front of the plunger. The plunger, hold-down and cutting blade are positioned behind the toe guard. A side guide can extend from the toe guard and provide a guide for the cutting blade.

An embodiment of the battery powered cutter includes a housing having a battery mount, a battery, a motor and a drive train operably connected to the motor. A cutting head includes a plunger having a cutting blade mounted fixedly to the plunger and a hold-down biasedly mounted to the plunger. The drive train operably connects the motor to the plunger. The plunger moves to contact the hold-down with the strap to temporarily secure the strap and the cutting blade contacts and cuts the strap.

In an embodiment, a foot has a shear edge thereon and the hold-down temporarily secures the strap against the foot as the cutting blade cuts the strap at the shear edge. The hold-down can be biasedly mounted to the plunger by one or more springs and guide elements to permit the hold-down to move toward and away from the plunger in a direction parallel to a direction of movement of the plunger.

The plunger can be configured to move toward the shear edge such that the hold-down contacts the strap and the springs compress to permit the cutting blade to contact and cut the strap.

These and other features and advantages of the present device will be apparent from the following description, taken in conjunction with the accompanying sheets of drawings, and in conjunction with the appended claims.

DETAILED DESCRIPTION

Figure 1A:
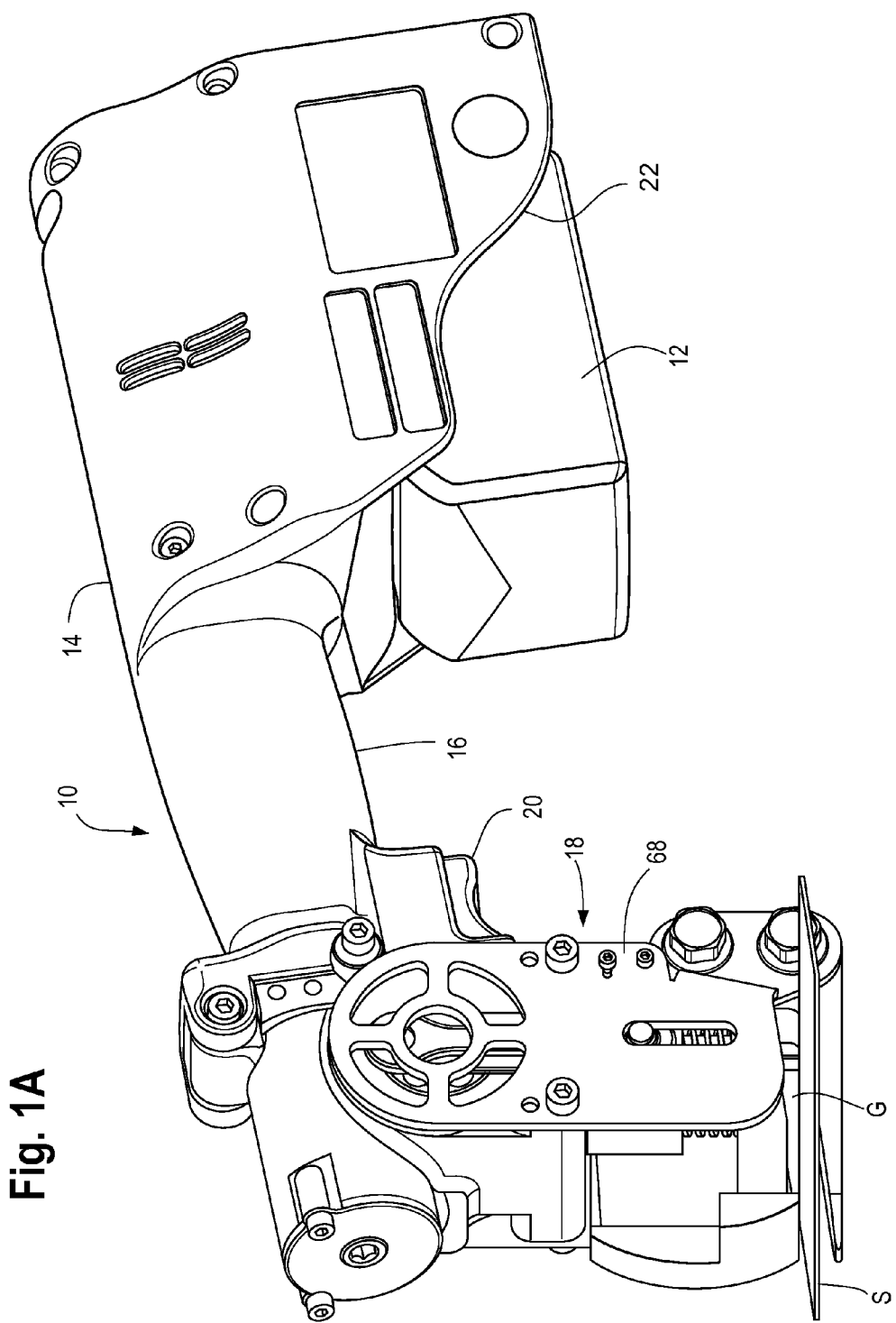
FIGS. 1A and 1B are perspective and side views of an embodiment of a powered two-stage strap cutter.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 1B:
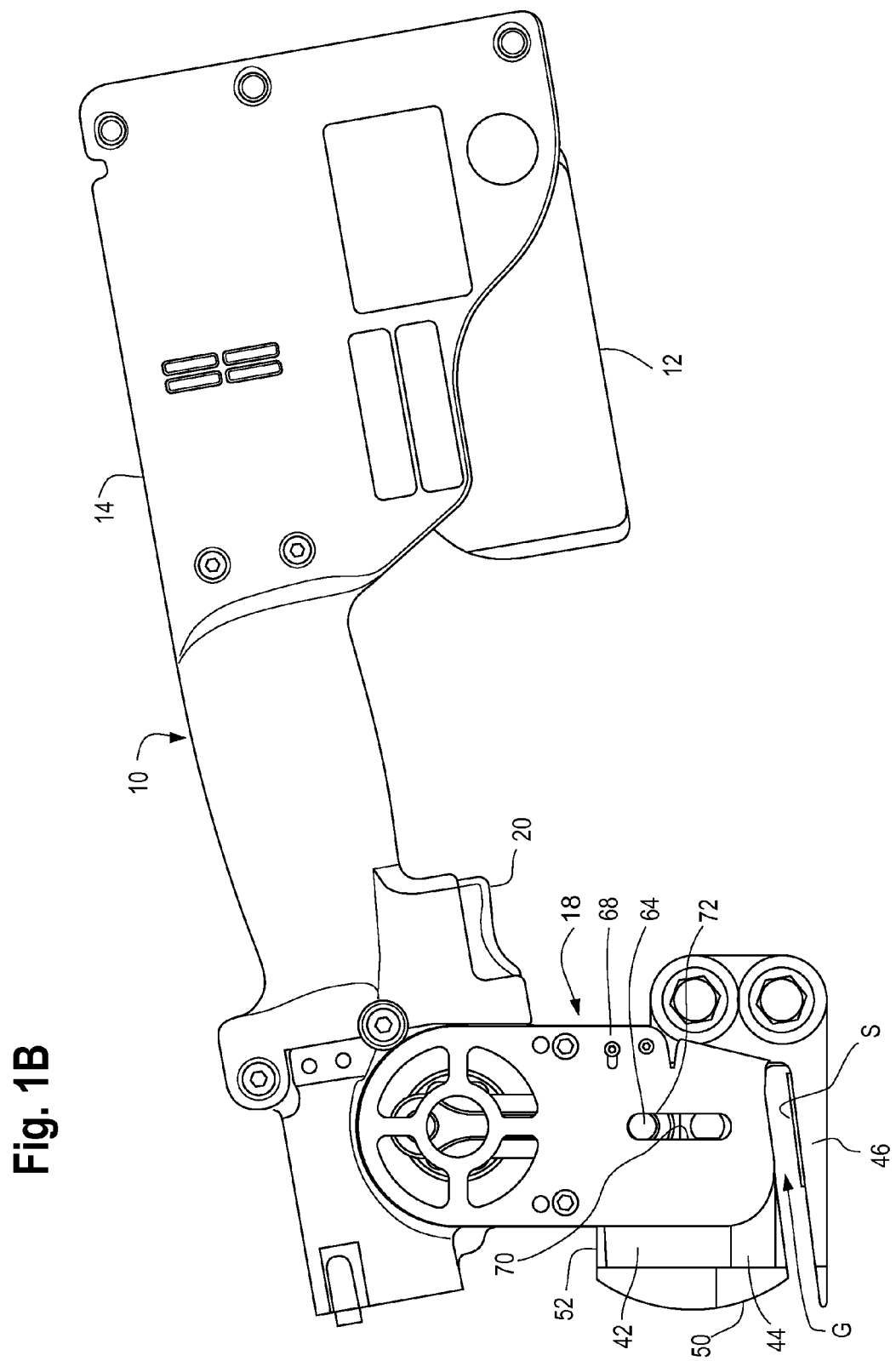

FIG. 1 illustrates an embodiment of a powered two-stage strap S cutting tool or cutter 10. The cutter 10 includes a power supply 12, a housing 14 having a grip handle 16 and a cutting head 18. An actuation switch 20, such as the illustrated trigger switch, is positioned on the housing 14 such that a user can readily position a finger on the switch 20 while grasping the grip handle 16 for operating the cutter 10.

The power supply 12 can be a battery, such as a lithium-ion or nickel cadmium battery having an operational voltage of, for example, about 14.4 to 24 volts. In an embodiment, the power supply 12 is removably mounted to the housing 14 in a receiver 22. Such an arrangement will be recognized by those skilled in the art.

Figure 5:
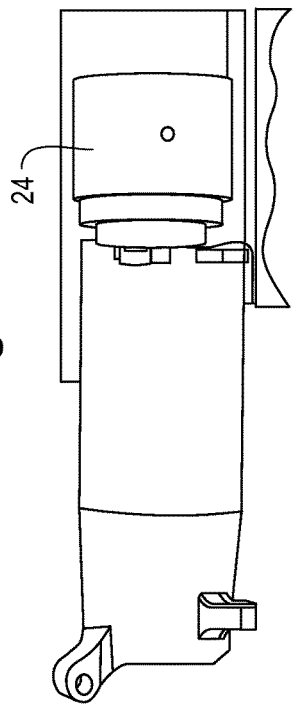
FIG. 5 shows a portion of one example motor for the cutter.
Figure 6:
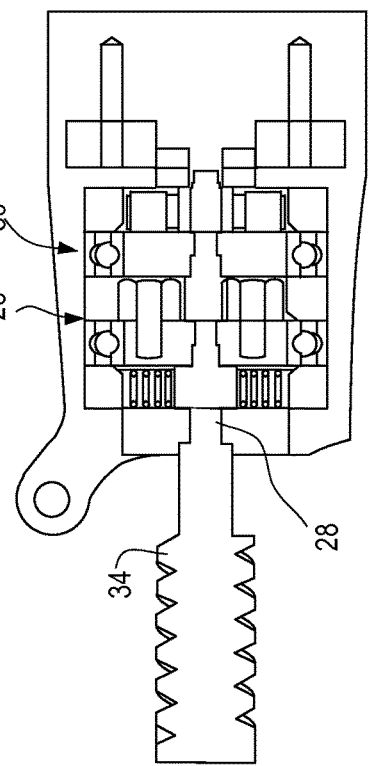
FIG. 6 shows a portion of one example drive train for the cutter.
Figure 7:
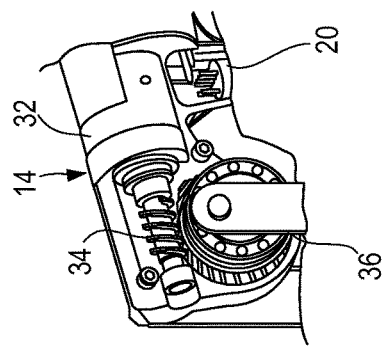
FIG. 7 shows another portion of the example drive train for the cutter.

Referring briefly to FIGS. 5-7, a motor 24 and drive train 26 are positioned at least in part within the housing 14. In an embodiment, the motor 24 includes an output shaft 28 having a gear 30. The gear 30 is configured to cooperate with a gear set 32, such as a planetary gear set to reduce the output speed of the motor 24 and to increase the output power or torque from the motor 24. The gear set 32 includes a final drive 34 that meshes with a drive gear 36 in the cutting head 18. The final drive 34 can be a linear gear that meshes with the drive gear 36. An example of a suitable drive is disclosed in Figiel, US Publication 2013-0085053, the disclosure of which is incorporated herein in its entirety by reference.

In an embodiment, the cutting head 18 is mounted at about an end of the housing 14 and is operably connected to the final drive 34 and drive gear 36. The cutting head 18 includes a body 38, a reciprocating plunger 40, a cutting blade 42 fixedly mounted to the plunger 40, a hold-down 44 element mounted to the plunger 40, a foot 46 and a shear edge 48. The cutter 10 can include a front toe guard 50 that extends from the cutting head 18, downwardly toward the foot 46, in front of the plunger 40, so that the plunger 40, hold-down 44 and cutting blade 42 are behind the toe guard 50. A side guide 52 can extend from the toe guard 50 to provide a guide along which the cutting blade 42 moves.

The hold-down element 44 is mounted to the plunger 40 by one or more biasing elements 54, such as the illustrated springs, positioned around guide elements 56, such as the example guide bolts. The foot 46 can be configured with the shear edge 48 formed as part thereof (e.g., on a side of the foot 46).

To drive the plunger 40, the cutting head 18 includes a link 58 operably connected to the drive gear 36 and the plunger 40 to move the plunger 40 in a reciprocating manner. The link 58 is pivotally mounted to the plunger 40 and is pivotally mounted to an eccentric element 60 operably mounted to the drive gear 36. The eccentric element 60 can be directly mounted to the drive gear 36 or mounted to a separate member (for example a drive wheel 62) that is driven by the drive gear 36. In an embodiment, the link 58 is mounted to pins 64, 66 on the drive gear 36 or wheel 62 and the plunger 40, so that as the drive gear 36 rotates, the link 58 moves eccentrically to reciprocate the plunger 40.

The cutting head 18 can also include a side 68 plate on a side thereof, over the link 58, drive gear 36 and plunger 40. The side plate 68 can include a slotted opening 70 and the plunger 40 can include a projection 72 that moves along the slotted opening 70 as the plunger 40 reciprocates to maintain the plunger 40 and cutting blade 42 transverse to the strap S. In an embodiment, the plunger link pin 64 forms the plunger projection 72. In that the plunger 40 is mounted for reciprocating movement along the guide bolts 56, the plunger 40 is maintained normal to the strap S during movement and cutting.

Figure 2A:
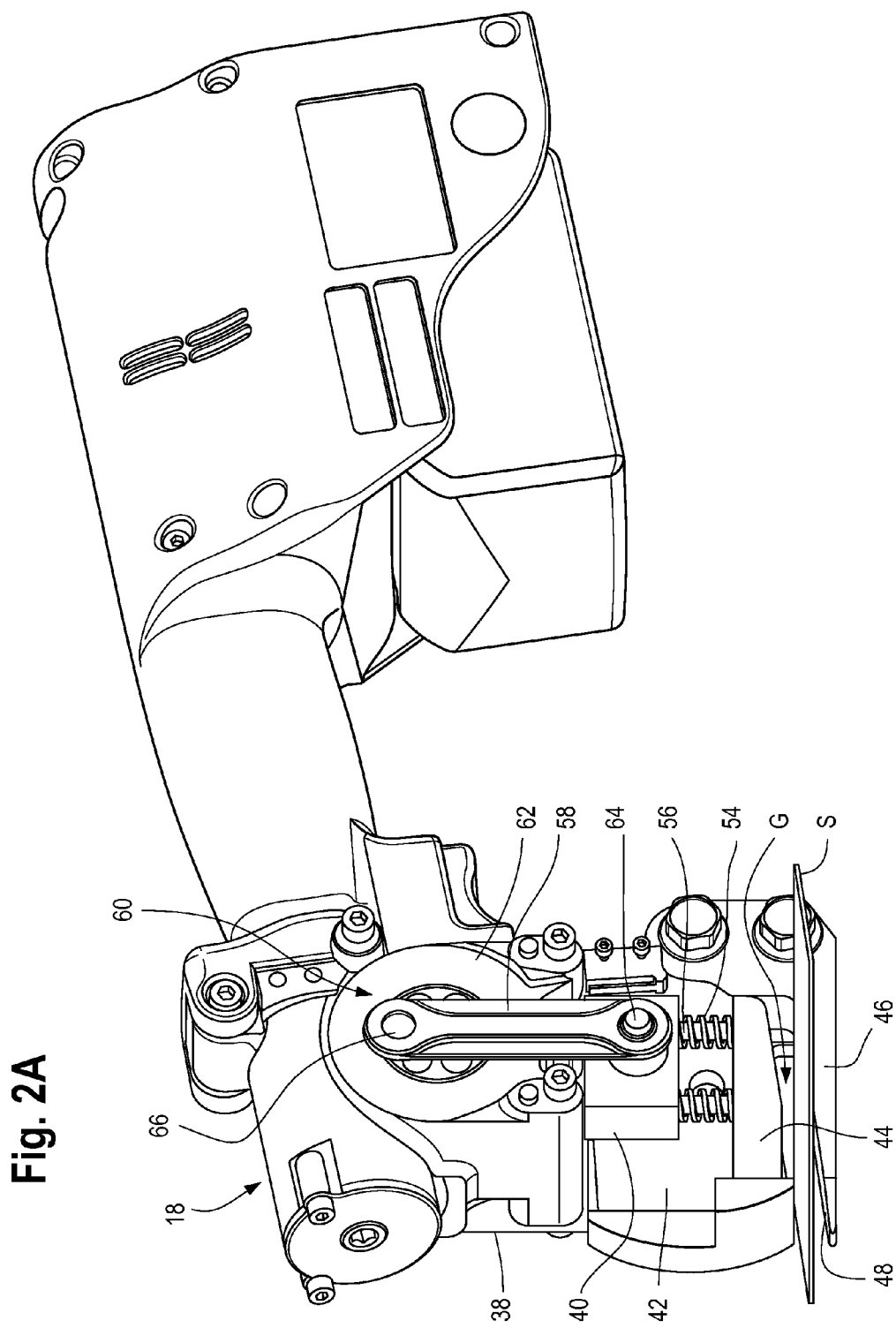
FIGS. 2A and 2B are perspective and side views of the cutter with the blade and hold-down in an open position and shown with a side plate removed for clarity of illustration.
Figure 2B:
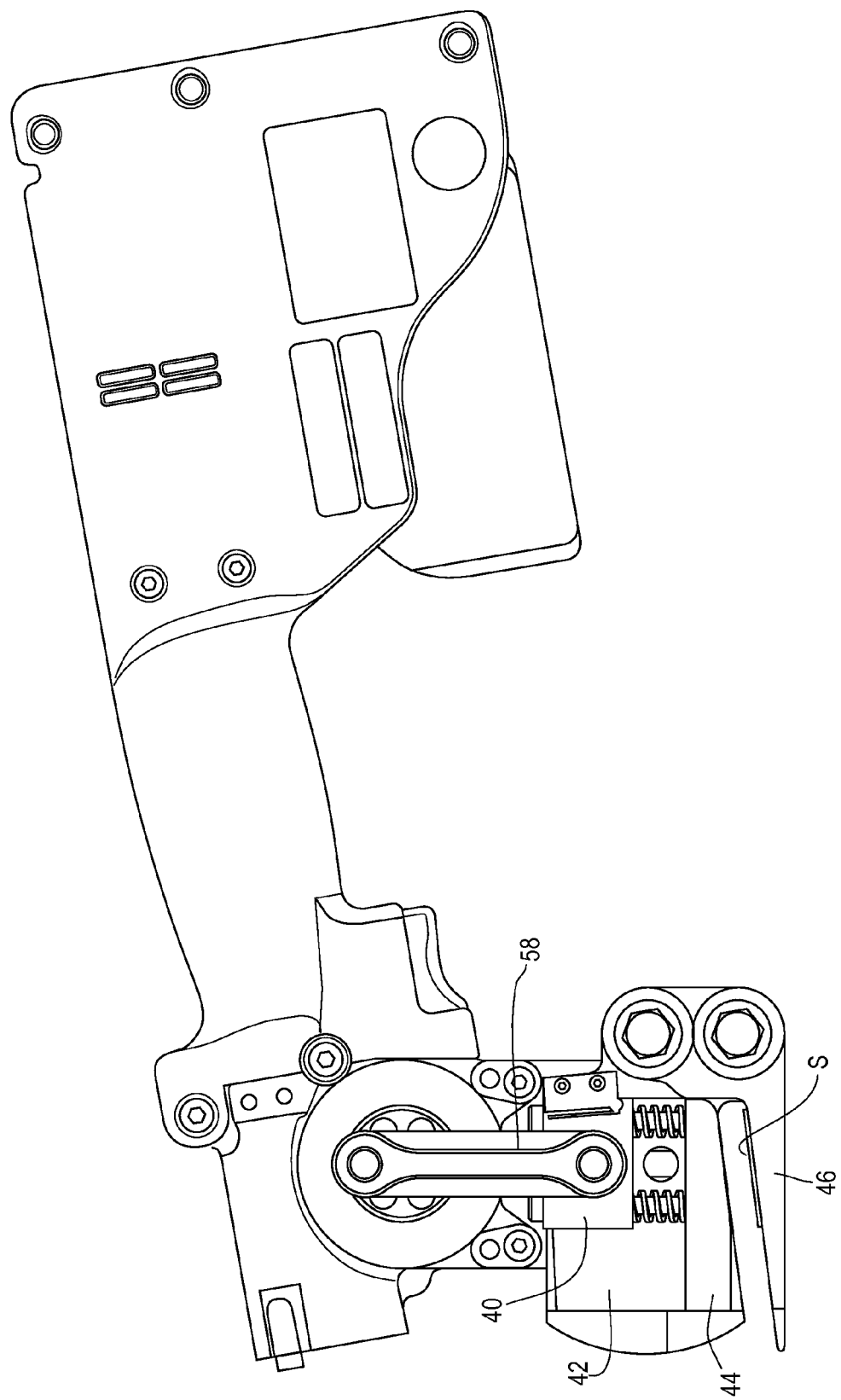
Figure 3A:
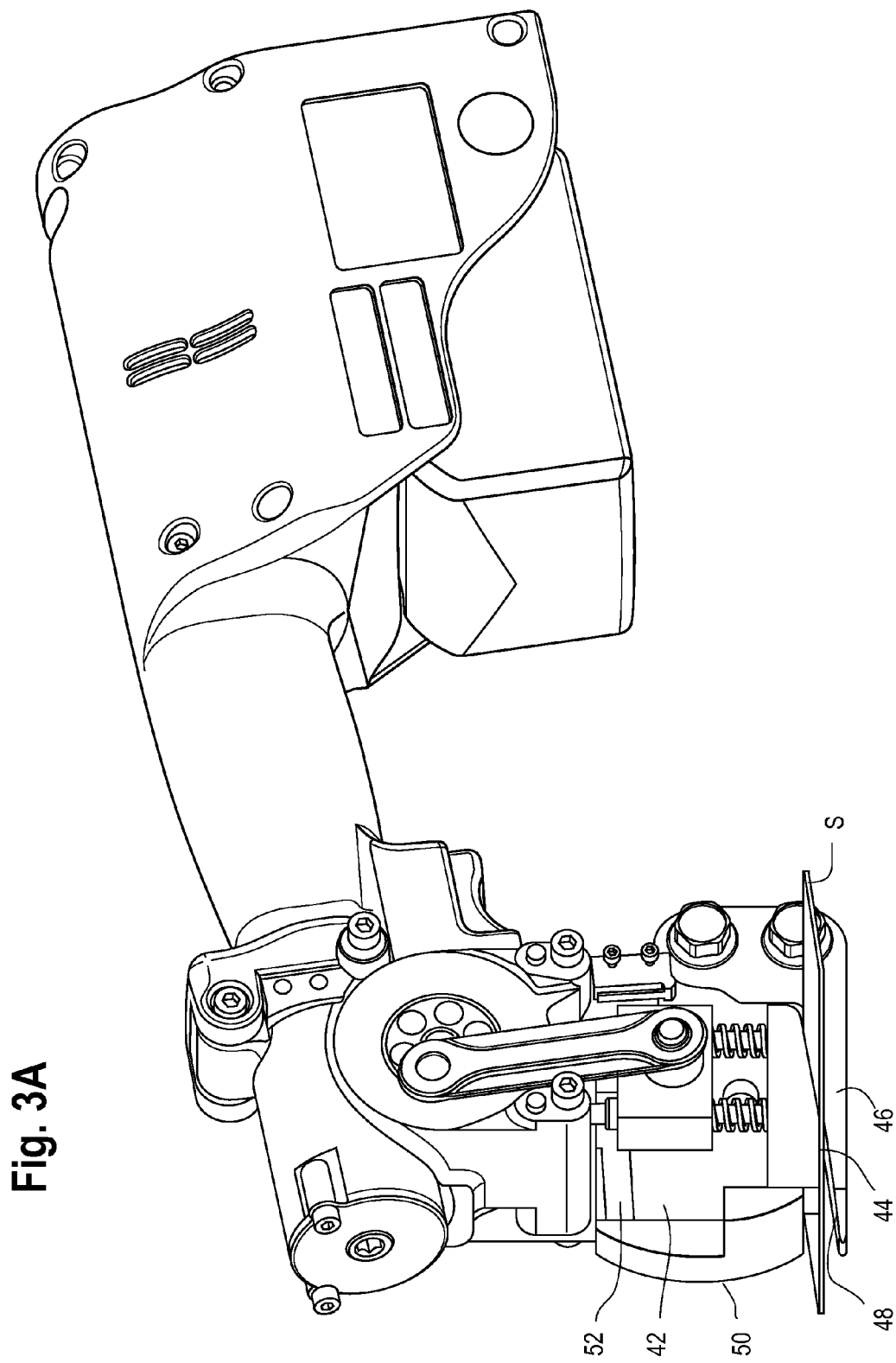
FIGS. 3A and 3B are perspective and side views showing the hold-down in the holding position and the blade in the open and partially retracted position.
Figure 3B:
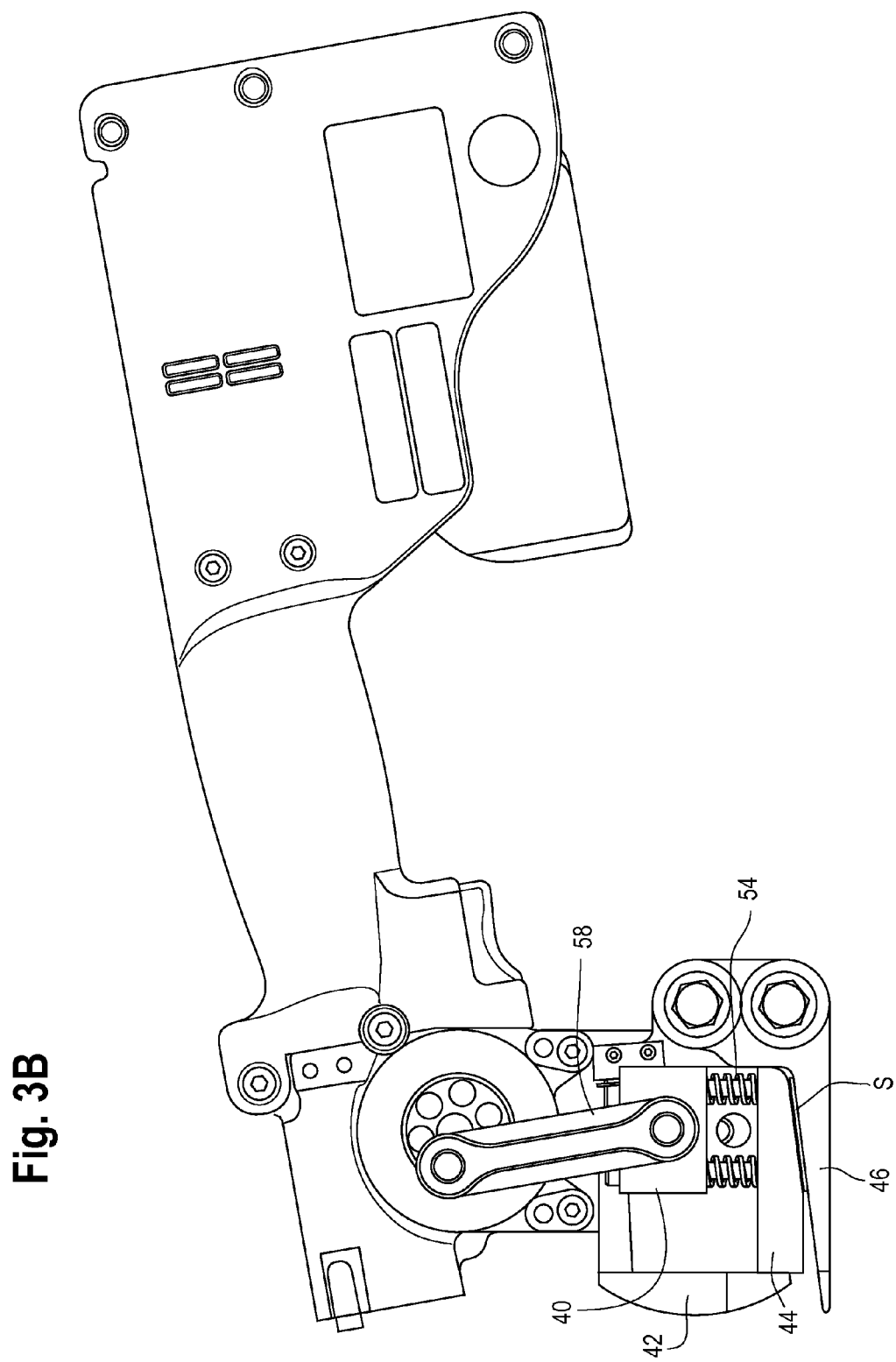

The plunger 40 moves through three positions in two stages. Referring to FIGS. 2A and 2B, in a first refracted position, the plunger 40, cutting blade 42 and hold-down 44 are fully refracted and a gap G is defined between the hold-down 44/cutting blade 42 and the foot 46 to receive the strap S. As the drive gear 36 rotates, in the first stage as seen in FIGS. 3A and 3B, the plunger 40 moves toward the foot 46, and the hold-down 44 urges the strap S against the foot 46 to temporarily secure the strap S in place. In this position, the cutting blade 42 is in a partially retracted position and may not have descended sufficiently to contact the strap S, and the springs 54 between the plunger 40 and the hold-down 44 are extended. In this position, the hold-down 44 secures the strap S against the foot 46.

Figure 4A:
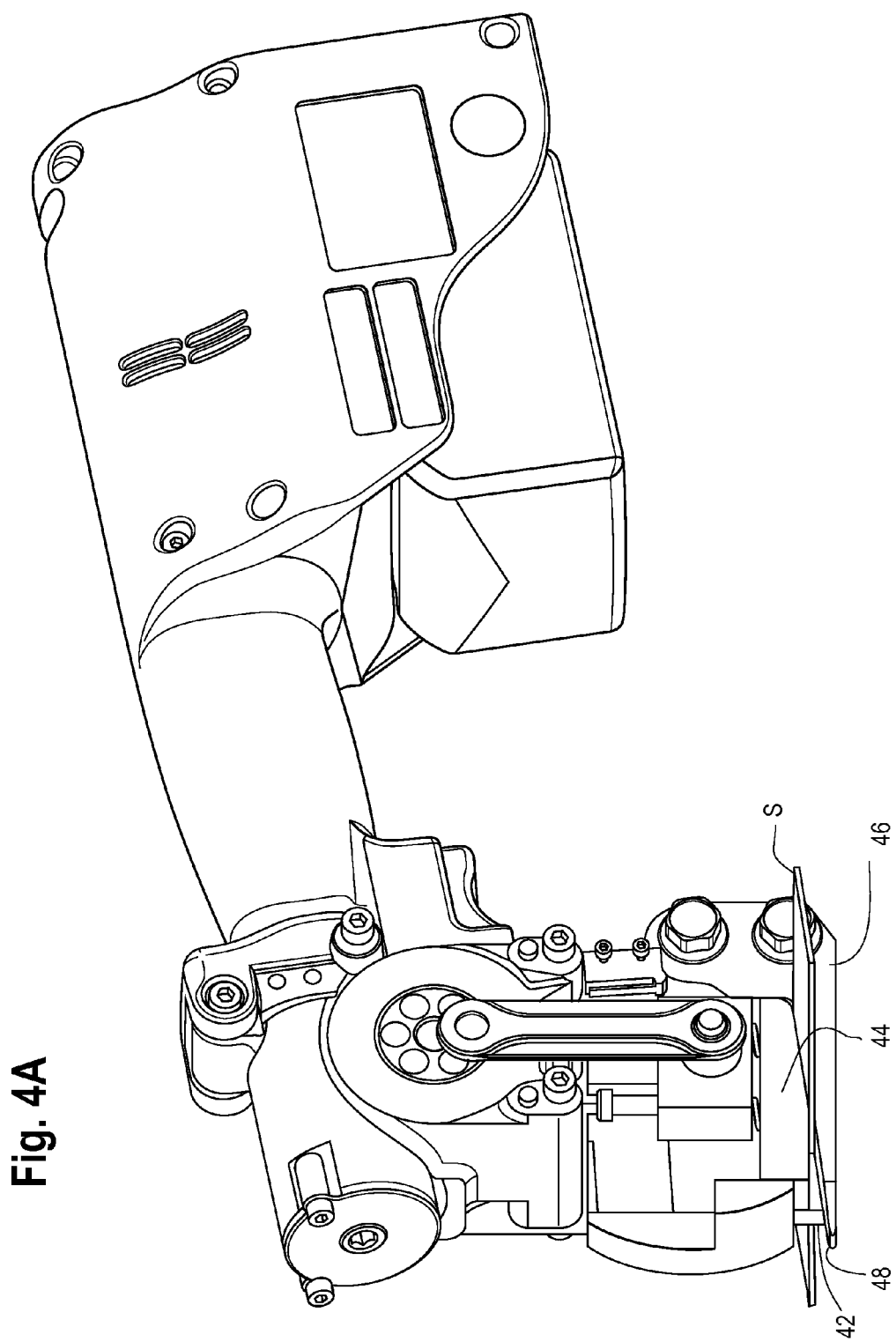
FIGS. 4A and 4B are perspective and side views showing the hold-down in hold-down position and the blade in the cutting position.
Figure 4B:
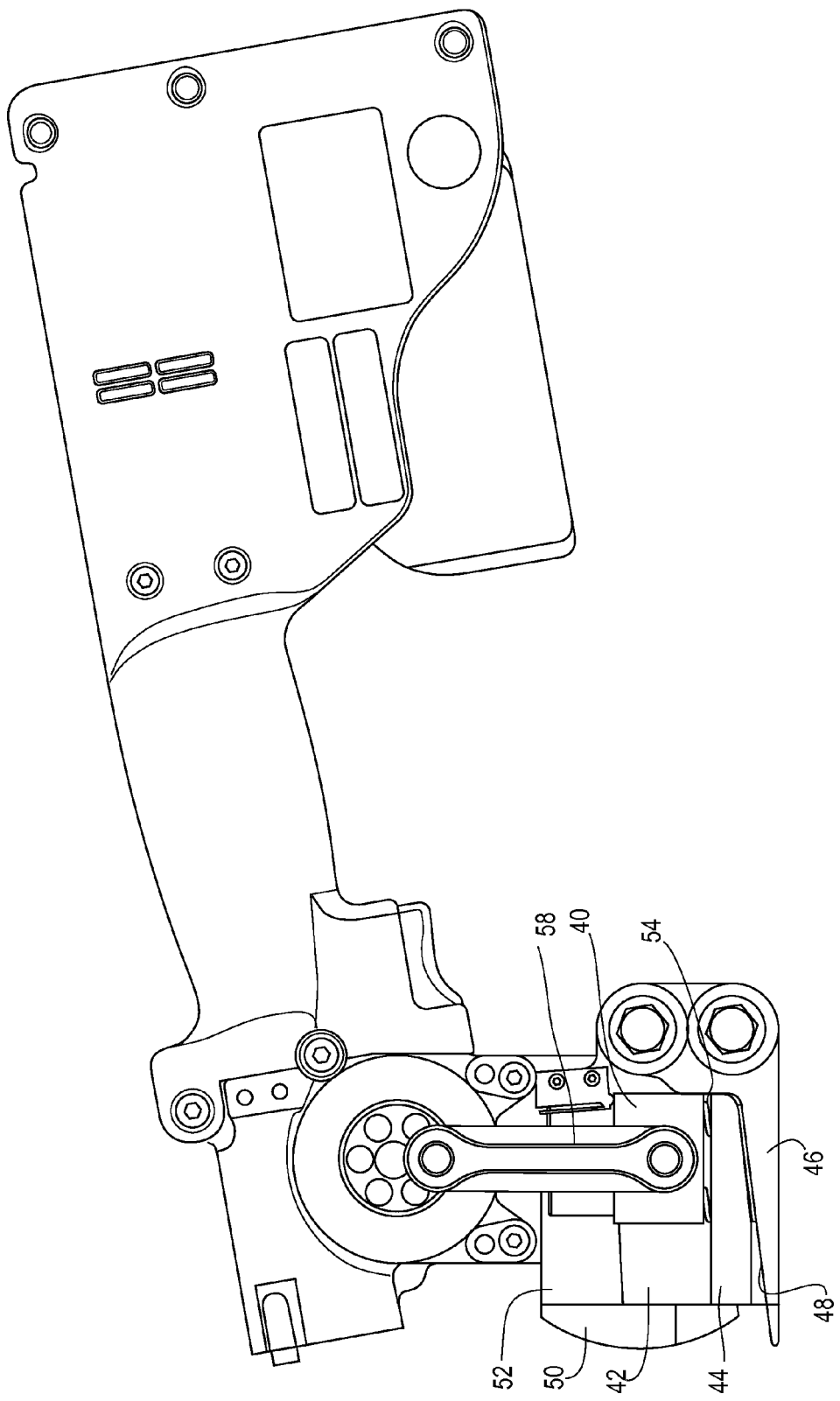

As the drive gear 36 further rotates, as seen in FIGS. 4A and 4B, in the second stage, the hold-down 44 remains in place securing the strap S, the plunger 40 continues to move toward the foot 46 compressing the springs 54 (further securing the hold-down 44 against strap S), and moving the cutting blade 42 down to and beyond the shear edge 48 to cut the strap S. Continued rotation of the drive gear 36 then retracts the plunger 40 and blade 42 to the retracted position.

In operation, the cutter 10 is in a fully retracted position. A user positions the strap S on the foot 46, under the toe guard 50, hold-down 44 and cutting blade 42. The user then actuates the cutter 10 (for example, pulling the trigger switch 20) to actuate the motor 24. The motor 24 drives the drive gear 36 which drives the link 58 to reciprocate the plunger 40. As the plunger 40 reciprocates, it moves toward the foot 46 and the hold-down 44 contacts the strap S to temporarily secure the strap S in place against the foot 46. Further rotation of the drive gear 36 moves the plunger 40 toward the foot 46, compressing the springs 54, to further secure the strap S against the foot 46, and moves the cutting blade 42 down to and beyond the shear edge 48, cutting the strap S. It will be appreciated that the hold-down 44 secures the strap S in place against the foot 46 as the cut is being carried out. Thus one or both of the strap ends can be secured during cutting.

As noted above, the cutter 10 is a two-stage cutter. In the first stage, the strap S is held in the cutter 10 by the hold-down 44 against the foot 46, and in the second stage, the strap S is cut while one or both ends are temporarily secured by the hold-down 44. It will be appreciated that the description two-stage refers to holding the strap and cutting the strap S, and that the stages may be sequentially carried out and/or the first stage, e.g., moving the hold-down 44 to contact the strap S, may be carried out with the second stage, e.g., as the cutting blade 42 engages the strap S.

The switch 20 can be configured such that a first actuation of the trigger 20 functions to cut the strap S, that is it cycles the cutter 10 through hold-down and cutting, and a second actuation of the trigger 20 functions to retract the plunger 40 and blade 42. The switch 20 can also be configured such that a single actuation of the trigger 20 moves the cutter 10 through the cutting and retraction cycles.

It should be understood that various changes and modifications to the disclosed embodiments will be apparent to those skilled in the art. Such changes and modifications can be made without departing from the spirit and scope of the present disclosure and without diminishing its intended advantages. It is therefore intended that such changes and modifications be covered by the appended claims.

What is claimed is:

1. A hand-held powered cutter, comprising:
   a housing defining a grip handle;
   a power supply mounted to the housing, wherein the power supply is a battery;
   a motor positioned at least in part in the housing, the motor powered by the power supply;
   a drive train operably connected to the motor and driven by the motor; and
   a cutting head mounted at about an end of the housing, the cutting head comprising:
   a plunger operably connected to the drive train and configured for reciprocal movement;
   a cutting blade operably mounted to the plunger;

a hold-down biasedly mounted to the plunger by one or more springs;

a foot configured to support a strap to be cut;

one or more guide elements mounting the hold-down to the plunger, wherein one of the springs is positioned one of the guide elements, between the hold-down and the plunger; and a shear edge, wherein the plunger moves toward the foot to move the hold-down into contact with the strap securing the strap against the foot, and wherein as the hold-down secures the strap, the cutting blade contacts and cuts the strap at the shear edge, and wherein when the plunger moves toward the foot and the hold-down contacts the strap, the one or more springs compress to permit the cutting blade to contact and cut the strap.

2. The cutter of claim 1, wherein the drive train includes at least one gear coupled to the motor to drive the plunger.

3. The cutter of claim 2 including a link extending from the at least one gear to the plunger.

4. The cutter of claim 3, wherein the at least one gear is a drive gear and wherein the link is eccentrically coupled to the drive gear to move the plunger.

5. The cutter of claim 3, wherein the link eccentrically couples the plunger to the drive gear to move the plunger in a reciprocating manner.

6. The cutter of claim 1 including a toe guard extending from the cutting head toward the foot, in front of the plunger, wherein the plunger, hold-down and cutting blade are positioned behind the toe guard.

7. The cutter of claim 6 including a side guide extending from the toe guard and providing a guide for the cutting blade.

8. A hand-held battery powered cutter for a strap, comprising:

a housing having a battery mount and defining a grip handle;

a battery;

a motor powered by the battery;

a drive train operably connected to the motor and configured to be driven by the motor; and a cutting head mounted at an end of the housing, the cutting head including:

a plunger having a cutting blade mounted fixedly thereto;

a hold-down biasedly mounted to the plunger by one or more springs, the drive train operably connecting the motor to the plunger; and one or more guide elements mounting the hold-down to the plunger, wherein one of the springs is positioned one of the guide elements, between the hold-down and the plunger, wherein the plunger moves to contact the hold-down with the strap to temporarily secure the strap, and wherein the cutting blade contacts and cuts the strap, and wherein when the plunger moves toward the foot and the hold-down contacts the strap, the one or more springs compress to permit the cutting blade to contact and cut the strap.

9. The cutter of claim 8 including a foot having a shear edge thereon, wherein the hold-down temporarily secures the strap against the foot as the cutting blade cuts the strap at the shear edge.

* * * * *

UNITED STATES PATENT AND TRADEMARK OFFICE
CERTIFICATE OF CORRECTION

PATENT NO. : 9,630,265 B2  
APPLICATION NO. : 14/263435  
DATED : April 25, 2017  
INVENTOR(S) : Janusz Figiel et al.

Page 1 of 1

It is certified that error appears in the above-identified patent and that said Letters Patent is hereby corrected as shown below:

In the Specification

Column 3, Line 58, "refracted" to read as --retracted--.

Column 3, Line 60, "refracted" to read as --retracted--.

Signed and Sealed this
First Day of August, 2017

Joseph Matal
*Performing the Functions and Duties of the*
*Under Secretary of Commerce for Intellectual Property and*
*Director of the United States Patent and Trademark Office*